United States Patent [19]

Bauer et al.

[11] Patent Number: 5,209,942
[45] Date of Patent: May 11, 1993

[54] LOW FAT/NO FAT SALAD DRESSING HAVING MIMETIC FUNCTIONAL PROPERTIES FAT AND A PROCESS THEREFOR

[75] Inventors: Roland Bauer, West Milford; Jo Ann Cuccurullo, Cresskill; Philip E. Dazo, Edison Township, Middlesex County; Daniel J. Kochakji, West Milford; Steven M. Rikon, Ringwood; Richard E. Rubow, Ridgefield Park, all of N.J.

[73] Assignee: Thomas J. Lipton, Co., Division of Conopco, Inc., Englewood Cliffs, N.J.

[21] Appl. No.: 799,583

[22] Filed: Nov. 27, 1991

[51] Int. Cl.⁵ .......................... A23C 1/24; A23C 1/05
[52] U.S. Cl. ................................. 426/573; 426/589; 426/605; 426/613; 426/804
[58] Field of Search ............... 426/589, 605, 613, 654, 426/573, 804

[56] References Cited

U.S. PATENT DOCUMENTS

| | | | |
|---|---|---|---|
| 4,107,335 | 8/1978 | Glickstein et al. | 426/96 |
| 4,140,808 | 2/1979 | Johnson | 426/589 |
| 4,146,652 | 3/1979 | Kahn et al. | 426/589 |
| 4,292,333 | 9/1981 | Bosco et al. | 426/602 |
| 4,308,294 | 12/1981 | Rispoli et al. | 426/564 |
| 4,465,702 | 8/1984 | Eastman et al. | 426/578 |
| 4,529,613 | 7/1985 | Mezzino et al. | 426/654 |
| 4,826,656 | 5/1989 | Huber et al. | 426/654 |
| 4,911,946 | 3/1990 | Singer et al. | 426/613 |
| 4,980,193 | 12/1990 | Tuason Jr. | 426/654 |
| 5,011,701 | 4/1991 | Baer et al. | 426/804 |
| 5,087,471 | 2/1992 | Combes et al. | 426/589 |

OTHER PUBLICATIONS

Ultra-Tex 4 Product Brochure 32887-530.
Mira-Thik Product Brochure Aug. 1987; A. E. Staley Mfg. Co.
Avicel Bulletin G-34; FMC Corporation.
JP54-054, 169-Abstract.

*Primary Examiner*—Jeanette Hunter
*Attorney, Agent, or Firm*—James J. Farrell

[57] ABSTRACT

A fat mimetic composition which may be used in a low/no fat salad dressing and processes for their preparation are disclosed employing a unique combination of microcrystalline cellulose, cold water swelling starch and gum to provide excellent fat-like properties.

8 Claims, No Drawings

LOW FAT/NO FAT SALAD DRESSING HAVING MIMETIC FUNCTIONAL PROPERTIES FAT AND A PROCESS THEREFOR

BACKGROUND OF THE INVENTION

1. Field of the Invention

This invention relates to a unique combination of ingredients and a process for the preparation of low fat/no fat, reduced calorie salad dressings which mimic the functional properties of fat.

2. The Related Art

Recent trends in the field of salad dressings have been directed to the development of reduced fat or substantially fat-free products which possess a smooth and creamy mouthfeel, as well as a texture and lubricity which approach the texture and mouthfeel of edible fat containing food products. Substantial work has been carried out with bulking agents such as powdered and microcrystalline cellulose in fat-containing and reduced fat food products. U.S. Pat. No. 5,011,701 and patents cited therein relate to the preparation, or use of various types of cellulose in various food products. Such cellulose materials have been used or proposed for reduced fat or substantially fat-free food products. However, as the fat content is reduced in food products containing substantial levels of cellulose products such as microcrystalline cellulose, adverse organoleptic effects such as undesirable mouthcoating or drying sensations, and a lack of a well-rounded organoleptic sensation corresponding to that provided by conventional fat-containing food products such as viscous and pourable dressings, tend to become more pronounced.

Microcrystalline cellulose has been used in low and reduced calorie food formulations as both a carbohydrate thickening agent and as a fat replacer, with powdered products of relatively large particle size (e.g., 15-90 micrometer length) utilized for carbohydrate reduction and colloidal grades of submicron size being used to reduce fat, generally with the adverse result mentioned above.

U.S. Pat. No. 5,011,701 deals with this problem by a series of at least two high shear operations to insure the long term dispersibility of the microcrystalline cellulose. This is a relatively energy intensive process requiring substantial time and energy to accomplish.

In addition to microcrystalline cellulose, other ingredients have been employed in combination in attempts to produce low fat or no fat dressings. Starch, for example, when used alone may produce a gummy, pasty, chalky dressing with the tendency to block flavor. Further, a dressing using only starch will not have satisfactory pourability.

Heretofore, preparation of a low fat/no fat salad dressing prepared with microcrystalline cellulose yet having excellent fat functional mimetic properties while using relatively low energy processes has not been completely satisfactory.

Accordingly, it is an object of the invention to overcome one or more of the disadvantages of the art with the accompanying benefit of producing low fat/no fat, reduced calorie salad dressings with the taste and functionality of full fat salad dressings.

SUMMARY OF THE INVENTION

It has now been discovered that salad dressing can be produced with less thermal and mechanical energy than expected, yet a no/low fat salad dressing containing microcrystalline cellulose and starch as well as the other ingredients of this invention can be prepared. The invention focuses on the formulation and processing of a no/low fat (0-7%) salad dressing by employing a unique fat mimetic combination of cold water swelling starch, colloidal microcrystalline cellulose, xanthan gum and optionally algin derivatives and optionally opacifiers to produce the desired product. Titanium dioxide is the preferred opacifier and is added to improve the overall appearance of the dressing by making it more opaque and less translucent. The formulation substantially mimics the functional properties of fat. In addition, it has been discovered that two unique methods of addition of the ingredients, in the processing of this invention to produce salad dressings with the desired functionality, are critical.

According to the invention described more fully below, there is provided a fat mimetic composition which is used to provide an optionally low calorie, dispersed, reduced or low fat salad dressing. The fat mimetic composition can frequently be used in other food materials where the organoleptic properties of fat are desirable. This dressing has a substantial functional and organoleptic resemblance to other dressings having a higher fat content.

The fat mimetic composition comprises a unique combination of an intimate mixture of:

30% to 70% colloidal microcrystalline cellulose;
30% to 70% cold water swelling starch;
1% to 15% gum selected from the group consisting of xanthan, gum, carrageenan gum, locust bean gum, guar and the like provided there is sufficient gum to protect the microcrystalline cellulose.
0% to 5% alginate derivatives selected from the group consisting of propylene glycol alginate, sodium alginate and the like;
0% to 5% opacifier selected from the group consisting of $TiO_2$, milk solids and the like provided an opacifier is desirable.
70 to 99% water sufficient to form a stable essentially dispersed mimetic system.

This composition, when formulated in a dressing containing no fat or very low fat up to about 7% gives an organoleptic result which is essentially similar to dressings containing higher amounts of fat. The amount of mimetic employed is about 1% to 10% dry solids on a formula basis.

The unique no fat or low fat dressing has the following composition:

0.1%-10% colloidal microcrystalline cellulose;
0.1%-3% for pourable dressing and higher amounts for gelled consistency;
0.5%-4.5% cold water swelling starch;
0.1%-0.6% of gum selected from the group consisting of xanthan gum, carrageenan gum, locust bean gum, guar, and the like;
0%-0.3% of alginates or alginate derivatives preferably propylene glycol alginate;
0%-0.4% opacifier selected from $TiO_2$, milk solids and the like;
0.1%-25% flavor cocktail consisting essentially of spice extractives, natural or artificial flavors, relishes, vegetable particulates and the like;
3%-20% acidulant selected from distilled vinegar, cider vinegar, phosphoric acid, organic acids and the like;

0%-30% sweetening agent selected from the group consisting of synthetic sweeteners, high fructose corn syrup, corn syrups, sugar, and the like.

15%-80% water;

0%-7% oil selected from the group consisting of soybean oil, canola oil, olive oil, cottonseed oil, and their partially hydrogenated derivatives and the like;

In addition two unique method of preparation are described herein.

In the first case, the microcrystalline cellulose is slurried under agitation in an appropriate amount of water, the xanthan gum is then added to form a thickened slurry.

The next steps involve sequential addition under continued agitation of:
 a) sweeteners
 b) acids and flavors; and
 c) salt The opacifier is then added to the admixtures. The dry blend of cold water swelling starch is added next, then the alginate and preservatives and last oil, if any. Agitation is continued throughout. After the ingredients are all added, the admixture is emulsified and bottled.

In the second case, a dry blend is prepared of the microcrystalline cellulose, the xanthan gum, the cold water swelling starch, the alginate and the opacifier. This dry blend is then slurried with agitation in an appropriate amount of water. With continuing agitation, the compensating ingredients are added, i.e., the additional xanthan gum and the alginate, if any, the sweeteners are then added together with the acid, flavors and salt. The preservatives such as sodium benzoate, potassium sorbate and EDTA may be added and again the oil is added last. Agitation is continued throughout to maintain the admixture. The admixture is finally emulsified and then bottled.

DETAILED DESCRIPTION OF THE INVENTION

Generally, the fat mimetic composition will contain five ingredients which when further formulated with appropriate components, produce substantially the organoleptic effect of other dressings having more fat. The ingredients on a dry basis are:
 a) colloidal microcrystalline cellulose 30% to 70% and preferably 50% to 60%
 b) cold water swelling starch 30% to 70%, preferably 40% to 50%;
 c) xanthan gum 1% to 15%, preferably 3% to 6%;
 d) optionally alginate 0% to 5% and preferably when present propylene glycol alginate 1% to 3%,
 e) the opacifier is also optional and when present, is present at an amount of about 0 to 5%, preferably 0.5% to 4%.

This fat mimetic composition may be used to advantage with the general dressing formulations described below.

Generally, the low or no fat salad dressings of the invention contain from about 0.25 to about 4 weight percent of dispersed particulate, microcrystalline cellulose, from about 50 to about 99 weight percent of water, from about 1 to about 35 weight percent digestible carbohydrates, from about 0 to about 10 weight percent protein, and less than about 7 weight percent of digestible triglycerides, preferably 0 to 3%.

The microcrystalline cellulose of the invention may be any microcrystalline cellulose prepared in known manner such as for example Avicel ® which is a registered trademark of FMC Corporation. The preparation and use of this type of microcrystalline cellulose is described in Bulletin G-34 on Avicel produced by FMC.

Avicel CL-611 is a particularly preferred microcrystalline cellulose because of its colloidal properties. This material is a colloidal grade prepared by co-processing with carboxymethyl cellulose and sodium carboxymethyl cellulose. When used herein, microcrystalline cellulose preferably means such a co-processed cellulose 70% of the material has a particle size of less than 0.2 microns.

Selected hydrocolloids may be used to advantage, for example, xanthan gum. Although xanthan gum is commonly used at lower levels to protect microcrystalline cellulose as described in the FMC Brochure mentioned above, applicants employ a substantially higher proportion to obtain the beneficial properties of the gum. Suspension, fat mimetic properties and the like are improved by higher usage.

The most effective gum is xanthan gum. For example, an aqueous microcrystalline cellulose dispersion having a 2% to 10% microcrystalline cellulose solids content may be mixed in a low shear mixer, such as a Hobart mixer with an amount of gum equal to to 20% of the weight of the cellulose dispersion.

By "xanthan gum" is meant the heteropolysaccharide produced by fermentation of the microorganism of the genus Xanthomonas. A discussion of the physical and chemical properties may be found in Industrial Gums, R.L. Whistler, Ed., Academic Press, N.Y. (1973). Locust bean, guar, etc., may also be used.

Carrageenans may also be used. They are structural polysaccharides of red sea plants such as *Chondus crisous* and *Gigartina stellata*. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan has a general linear structure having substantially three pendant sulfate groups for each two monosaccharide groups along the polymer backbone.

Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide groups along the backbone. A discussion of the physical and chemical properties of lambda carrageenan may be found in Industrial Gums mentioned above.

Addition of gum at some stage in the process to the microcrystalline cellulose dispersion has several purposes. Coating the particulate cellulose with gu has the qualities of improving mouthfeel, improving texture, mitigating undesirable flavors and sensations, and improving stability.

It is important to add the gum without clumping or aggregation so as to form a well mixed dispersion.

Additional bodying agents may be used in the dressing to provide desired body or viscosity in accordance with conventional practice, in addition to the xanthan/MCC complex dispersion (which serves as a creamy functional bodying agent). This bodying agent may be a starch paste or may comprise an edible gum such as xanthan gum, guar gum, propylene glycol ester of alginic acid or the like. Starch, may typically be present at a level of from about 0.5 percent to about 5 percent. The edible gum will typically be present at lower levels to provide desired body and texture.

The microcrystalline cellulose described above must be used in combination with a cold water swelling starch such as Mirathik ® 468, a registered trademark of AE Staley & Co. or Ultra Tex 4, a cold water swelling starch available from National Starch and Chemical Co. The Mirathik 468 starch, which is fully described in a Staley Bulletin on Mirathik, and in U.S. Pat. No. 4,465,702 hereby incorporated by reference herein, when used in the invention provides excellent properties which are substantially similar to fat. A proper balance of starch and the microcrystalline cellulose must be maintained.

Cold water swelling starch may be present in a ratio of about 0.5 to 1 to 2 to 1 based on the cellulose.

Most of the starches used in the art require cook-up. The current invention relates to the fact that cold water swelling modified corn or food starch can be substituted to produce finished product requiring less thermal or mechanical energy.

The low fat/no fat food products desirably comprise from about 40 to about 95 percent by weight moisture, from small amounts to about 50 percent carbohydrate, from about 0 to about 5 percent by weight protein and from about 0 to about 7 percent by weight of fat, as well as salt, flavoring agents and other food components. Various specific food applications will be described in more detail hereinafter.

The food dressing utilized in accordance with the present invention will generally contain from about 20 to about 96 percent by weight of water, and sufficient acidifying agent to provide the aqueous component of the dressing vehicle with a pH of less than 4.1, and preferably in the range of from about 2.75 to about 3.75. In accordance with conventional food dressing manufacture, depending on the desired pH, the amount of water in the dressing and the effect of additional components of the food dressing, the acidifying agent which may include acetic acid, fumaric acid or a mixture of acetic and phosphoric acids, will generaly be present in an amount of from about 0.1 to about 3.5 weight percent based on the total weight of the food dressing.

The food dressing vehicle which may be utilized includes oil-less dressings, pourable or viscous dressings and emulsified or non-emulsified food dressing products of the type commonly used as an adjunct on salads, vegetables, sandwiches and the like. Included within such classification are products such as fat-free mayonnaise, salad dressing and French dressing, and imitation thereof including condiments or reduced calorie products.

The oil, to the extent used in the dressing formulation, may be any of the well known edible triglyceride oils derived from vegetable matter, vegetable oils, such as, for example, palm kernel or corn oil, soybean oil, safflower oil, cottonseed oil, and the like, or mixtures thereof.

The sweetener used is typically corn syrup. However, other sweeteners such as sucrose, dextrose, fructose, corn syrup solids and synthetic sweeteners may also be utilized.

Corn syrups having a DE of less than about 50 preferably 15 to 42 are a particularly desirable component of such fat-free dressing formulations. Such corn syrup solids may be provided by acid, enzyme, or acid-enzyme hydrolysis of corn starch. The dextrose equivalent (DE) value may be calculated according to the formula $DE = 100/(Mn/180.16)$ where $Mn$ is the number average molecular weight of the corn syrup solids. A substantial proportion of 15-42 DE corn syrup solids may be provided in the pourable dressing products in order to provide maximum benefits. In this regard, the pourable dressing may desirably comprise from about 0 to about 30 weight percent, and preferably in the range of from about 5 to about 20 weight percent of such 15-42 DE corn syrup solids based on the total weight of the pourable dressing product. The low dextrose equivalent corn syrup solids are believed to provide the pourable dressing product with more pleasing fat-mimetic characteristics, and pleasing organoleptic characteristics.

Small amounts of any suitable emulsifying agent may be used in the salad dressing compositions of the invention. In this connection, egg yolk solids, protein, gum arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents in accordance with conventional food dressing manufacturing practices.

Various other ingredients, such as spices and other flavoring agents, and preservatives such as sorbic acid (including salts thereof) may also be included in effective amounts.

The dressing vehicle may have an aqueous pH of about 4.1 or lower, preferably in the range of from about 2.75 to about 3.75. Any suitable edible acid or mixture of acid may be used to provide the desired level of acidity in the emulsified dressing, with suitable edible organic and inorganic acids including lactic acid, citric acid, fumaric acid, malic acid phosphoric acid, hydrochloric acid, acetic acid and mixtures thereof. Acetic/-phosphoric and acetic/phosphoric/lactic are particularly preferred mixtures of acidifying agents. The amount utilized to achieve a desired pH will depend on a variety of factors known in the art including the buffering capacity of protein components of the dressing.

Applicants have also discovered that the specific process parameters including the order of addition, time of mixing, temperature, concentration of ingredients during sequential steps and the like are critical.

Having, generally described various aspects of the present invention, the invention will now be more particularly described with reference to the following specific Examples.

EXAMPLE 1

1. In a tank, add 1 part microcrystalline cellulose to 15-20parts of water under agitation. Mix for 10 minutes and then raise the ratio of water to microcrystalline cellulose to 30 to 1. Continue mixing for an additional 5 minutes.
2. Under agitation add the following ingredients in sequential order:
   5-6 parts high fructose corn syrup
   4-5 parts distilled vinegar
   0.5-0.6 parts of lemon juice concentrate
   1 part garlic juice
   4-5 parts of sugar
   1-2 parts salt
   2 parts of other flavor ingredients containing 0.02-0.03 parts of titanium dioxide 2-3 parts of a dry starch/sugar blend
Maintain agitation for an additional 10 minutes.
3. In a second tank, put 0.5-1.5 parts of partially hydrogenated soybean oil and place under agitation. To the oil add:
   0.08-0.10 parts of propylene glycol alginate
   0.5 parts modified food starch
   0.003-0.004 parts of calcium disodium ethylenediaminetetra-acetate (EDTA)
   agitate the mixture until smooth and continue mixing.
4. Add the contents from the second tank into the first containing the microcrystalline cellulose mixture under agitation.
5. Move the product to a holding tank and then bottle off.

EXAMPLE 2

| FAT MIMETIC FORMULAE: | versions | | |
|---|---|---|---|
| | A parts | B parts | C parts |
| MICROCRYSTALLINE CELLULOSE(1) | 0.3 | 4.0 | 5.6 |
| XANTHAN GUN(2) | 0.1 | 0.5 | 0.4 |
| STARCH(3) | 0.3 | 6.0 | 3.2 |
| PROPYLENE GLYCOL ALGINATE(4) | 0.1 | 0.4 | 0.5 |
| TITANIUM DIOXIDE DISPERSION(5) | 0.06 | 0.86 | 0.3 |
| WATER | 90-99 | 80-90 | 70-95 |

BOTH PREPARATION METHODS FOR EACH FORMULA:

Method one: Into a 1000 ml plastic beaker, add room temperature water (75° F.). Separately weigh out each of the remaining ingredients. Under agitation as above, add the microcrystalline cellulose. Mix for 3 to 5 minutes at 2000 RPM until smooth. Then, add the xanthan, and mix an additional 5 minutes until smooth. Then, add the starch, mix one minute. Even if not smooth, add the PGA, mix one minute, then titanium dioxide. Mix 10 minutes more until homogeneous.

Method two: into a 1000 ml plastic beaker, add room temperature water (75° F.) weigh out each of the remaining ingredients including titanium dioxide dispersion and blend them together in another container (manual mixing).

Add the dry blend fat mimetic slowly into the beaker containing water while agitating at high shear, approximately 2000 RPM, using a TALBOYS T-Line Laboratory Stirrer #134-1 fitted with propeller blades. The mixture is further agitated for 10 minutes until smooth.

Preferred vendors:
(1) Avicel CL-611, FMC Corp.
(2) Keltrol T, Kelco Div., Merck & Co.
(3) Mira-Thik 468, A.E. Staley Mfg. Co.
(4) Kelcoloid LVF, Kelco Div., Merck & Co.
(5) 9113 white dispersion S.D., Werner-Jenkinson Div., Universal Foods Corp.

| FAT MIMETIC "C" (from Example 1 containing 85% water) | DRESSING | | |
|---|---|---|---|
| | FRENCH STYLE 25 parts | THOUSAND ISLAND 26 parts | RANCH 30 parts |
| XANTHAN | — | 0.2 | 0.4 |
| STARCH | 1 | — | 1.5 |
| PROPYLENE GLYCOL ALGINATE | — | — | 0.1 |
| TITANIUM DIOXIDE | — | 0.1 | 0.4 |
| DISPERSION WATER | 25 | 21 | 42 |
| VINEGAR, 100 GR. | 9 | 8 | 8 |
| SOYBEAN OIL | 2 | — | — |
| SALT | 1.5 | 2 | 2 |
| TOMATO | 7 | 11 | — |
| SUGAR | 12 | 10 | 2 |
| FLAVORING/COLORING | 3 | 10 | 2.5 |
| PRESERVATIVES | 0.3 | 0.2 | 0.2 |
| HIGH FRUCTOSE CORN SYRUP | 15 | — | — |
| CORN SYRUP, 43 D.E. | — | 10 | 6 |
| MALTODEXTRIN | — | — | 4 |

To a suitable container, 70° F. water is added, under agitation the fat mimic is added. After approximately 10 minutes the mixture is smooth; the remaining liquids and solids (not including most of the tomato) is added under agitation. When the mixture is homogeneous (after approximately 10 minutes additional agitation), the mixture is emulsified, and the remaining part of the tomato portion is added back.

It is understood that the examples and embodiments described herein are for illustrative purposes only and that various modifications or changes in the light thereof will be suggested to persons skilled in the art and are to be included within the spirit and purview of this application and the scope of the appended claims

What is claimed is:

1. A fat mimetic composition comprising an intimate admixture of:
   30%-70% colloidal microcrystalline cellulose;
   30%-70% cold water swelling starch;
   1%-15% of gum selected from the group consisting of xanthan gum, carrageenan gum, locust beam gum, guar gum and mixtures thereof;
   0%-5% of alginate or alginate derivatives;
   0%-5% opacifier selected from the group consisting of $TiO_2$, milk solids and mixtures thereof;
   whereby the mimetic imparts organoleptic properties similar to fat when formulated at an amount of 1% to 10% in a dressing containing up to about 7% fat.

2. A fat mimetic composition as defined in claim 1 consisting essentially of:
   50% to 60% of said colloidal microcrystalline cellulose;
   40% to 50% of said cold water swelling starch;
   3% to 5% of said gum;
   1% to 3% of alginate wherein said alginate is propylene glycol alginate;
   0.5% to 4% of opacifier said opacifier being $TiO_2$.

3. A fat mimetic composition as defined in claim 1 consisting
   56% of said colloidal microcrystalline cellulose;
   4% of said cold water swelling starch;
   4% of said gum; said gum being xanthan gum;
   5% of said alginate; said alginate being propylene glycol alginate;
   3% of said opacifier; said opacifier being $TiO_2$.

4. A salad dressing containing up to 7% fat comprising:
   0.1 to 3.0% colloidal microcrystalline cellulose;
   0.5%-4.5% cold water swelling starch;

0.1%–0.6% of gum selected from the group consisting of xanthan gum, carrageenan gum, locust bean gum, guar, and the like;
0–0.3% of alginate derivatives selected from the group consisting of propylene glycol alginate; sodium alginate;
0%–0.4% opacifier selected from $TiO_2$, milk solids and the like;
0.1%–25% flavor cocktail consisting essentially of spice extractives, natural or artificial flavors;
0 to 3.5% acidulant;
0%–30% sweetening agent;
0%–7% oil;
15%–80% water;
said low calorie dressing having substantially identical organoleptic and functional properties as other dressings with higher fat content, said microcrystalline cellulose having been subjected to only low to moderate shear forces during process and about 70% having a particle size of less than about 0.2 microns.

5. A salad dressing according to claim 4 having:
0.1–2.0% of said colloidal microcrystalline cellulose;
0.1%–4% of said cold water swelling starch;
0.1%–0.5% of said gum selected from the group consisting of xanthan gum, carrageenan, locust bean, guar;
0.1%–2% of said alginate derivatives selected from the group consisting of propylene glycol alginate, sodium alginate;
0.1%–0.3% of said $TiO2$;
5%–25% of said flavor cocktail;
0.5%–3.5% of said acidulant;
5%–25% of said sweetening agent;
20%–70% water;
0%–3% oil.

6. A salad dressing according to claim 5 having:
0.8%–1.7% of said colloidal microcrystalline cellulose;
0.8%–2.5% of said cold water swelling starch;
0.12%–0.16% of said gum;
0%–0.15% of said alginate derivatives selected from the group consisting of propylene glycol alginate, sodium alginate;
0.1%–0.13% of said $TiO_2$;
4.5%–11.5% of said flavor cocktail;
0.8%–1.0% of acidulant wherein said acidulant is vinegar;
12%–27% of said sweetening agent;
45%–69% water;
0%–3% oil.

7. A process for preparing a low fat dressing comprising:
(a) adding 1 part of microcrystalline cellulose to about 10 to 30 parts of water, under agitation in a vessel at ambient temperature 60° F.–75° F. continuing agitation to form a dispersion;
(b) adding to the dispersion under agitation 0.1 to 0.2 parts of xanthan gum;
(c) adding under agitation the following ingredients in sequential order:
1–11 parts high fructose corn syrup/sugar,
4–5 parts distilled vinegar,
10–11 parts flavor cocktail,
0.02–0.05 parts of titanium dioxide,
1–2 parts of a cold water swelling starch,
0.5–1.5 parts of soybean oil,
0.08–0.10 parts of propylene glycol alginate,
0.5 parts modified food starch,
0.003–0.004 parts of calcium disodium, ethylenediaminetetra-acetate (EDTA),
(d) agitating the mixture until smooth with continued mixing;
(e) moving the product to a holding tank and then bottling.

8. A process for preparing a salad dressing comprising:
(a) adding 70 to 99 parts of water to a vessel and beginning agitation;
(b) preparing a dry mix containing
0.3 to 5.6 parts microcrystalline cellulose,
0.3 to 6 parts cold water swelling starch,
0.1 to 0.5 parts of xanthan gum,
0.1 to 0.5 parts of propylene glycol alginate,
04 to 0.52 $TiO_2$;
(c) adding the dry mix to the vessel containing the water under agitation to prepare a fat mimetic dispersion;
(d) in a second vessel containing 21–45 parts of water add
8 to 10 parts vinegar,
12 to 27 parts sweetener,
5 to 25 parts flavor cocktail,
0 to 3 parts oil;
(e) agitating the mixture in the second vessel until homogeneous;
(f) dispersing 25 to 30 parts of the fat mimetic in the homogeneous mixture in vessel two.

* * * * *